United States Patent

[11] 3,565,042

| [72] | Inventor | Allan H. Willinger<br>New Rochelle, N.Y. |
|---|---|---|
| [21] | Appl. No. | 755,291 |
| [22] | Filed | Aug. 26, 1968 |
| [45] | Patented | Feb. 23, 1971 |
| [73] | Assignee | Metaframe Corporation<br>Hawthorne, Calif. |

[54] BREEDING DEVICE
9 Claims, 3 Drawing Figs.

[52] U.S. Cl. .................................................. 119/3
[51] Int. Cl. ...................................................... A01k 61/00
[50] Field of Search .......................................... 119/3, 5

[56] References Cited
UNITED STATES PATENTS
| 3,118,424 | 1/1964 | Willinger ...................... | 119/3 |
| 3,216,395 | 11/1965 | Girard ........................... | 119/3X |
| 3,291,098 | 12/1966 | Halpert ......................... | 119/5 |
| 3,464,387 | 9/1969 | Martinez ....................... | 119/3X |

*Primary Examiner*—Hugh R. Chamblee
*Attorney*—Friedman & Goodman

ABSTRACT: In a breeding device including a frame adapted to hold a foraminous material the improvement which comprises holding means integral with the frame adapted to hold a strand of artificial breeding grass and mounting means for the frame.

In a breeding device including a frame adapted to hold a foraminous material, said frame adapted to be mounted on a side of an aquarium, the improvement which comprises at least one inwardly extending tab member integral with the upper surface of said frame adaptable to hold a deformable mounting means for mounting said breeding device in stationary position against a side of an aquarium and to simultaneously allow the netting to form a jump-proof baffle on all four sides of the top opening.

BREEDING DEVICE

BACKGROUND of the INVENTION

1. Field of the Invention

1. The present invention relates in general to an aquarium or fish tank accessory and in particular to a breeding device. This invention relates especially to a means for holding an artificial spray of breeding grass stationary within a breeding device. This invention also relates to means provided to mount the breeding device against an aquarium side firmly employing tab means inwardly of the breeding device to facilitate the securing operation.

2. Discussion of the Prior Art

Prior art fish-breeding devices for home aquarium generally use a V-insert to prevent female fish from eating young when born. Other devices uses a boxlike net with no provisions for preventing female fish from eating the young. The breeding device itself can be of the floating variety but can also be of the type shown and described in U.S. Pat. No. 3,118,424 to Allan H. Willinger.

SUMMARY of the INVENTION

This invention relates to an improvement in a breeding device including a frame adapted to hold a foraminous material which improvement comprises holding means integral with the frame adapted to hold a strand or spray of artificial breeding grass.

This invention also relates to another improvement in a breeding device including a frame adapted to hold a foraminous material which frame is adapted to be mounted on a side of an aquarium, the improvement comprising at least one inwardly extending tab member integral with said frame adaptable to hold a resilient mounting means for mounting said breeding device in stationary position against a side of an aquarium. The inwardly extending tab member allows the foraminous material to extend inwardly and uniformly on all four sides of the upper surface of the frame. This prevents the pregnant female fish from jumping out of the breeding device in addition to retaining any young fish born.

DESCRIPTION of the DRAWINGS

The invention can be more readily understood and appreciated by reference to the accompanying drawings, in which.

DESCRIPTION OF PREFERRED EMBODIMENTS

Figure 1:
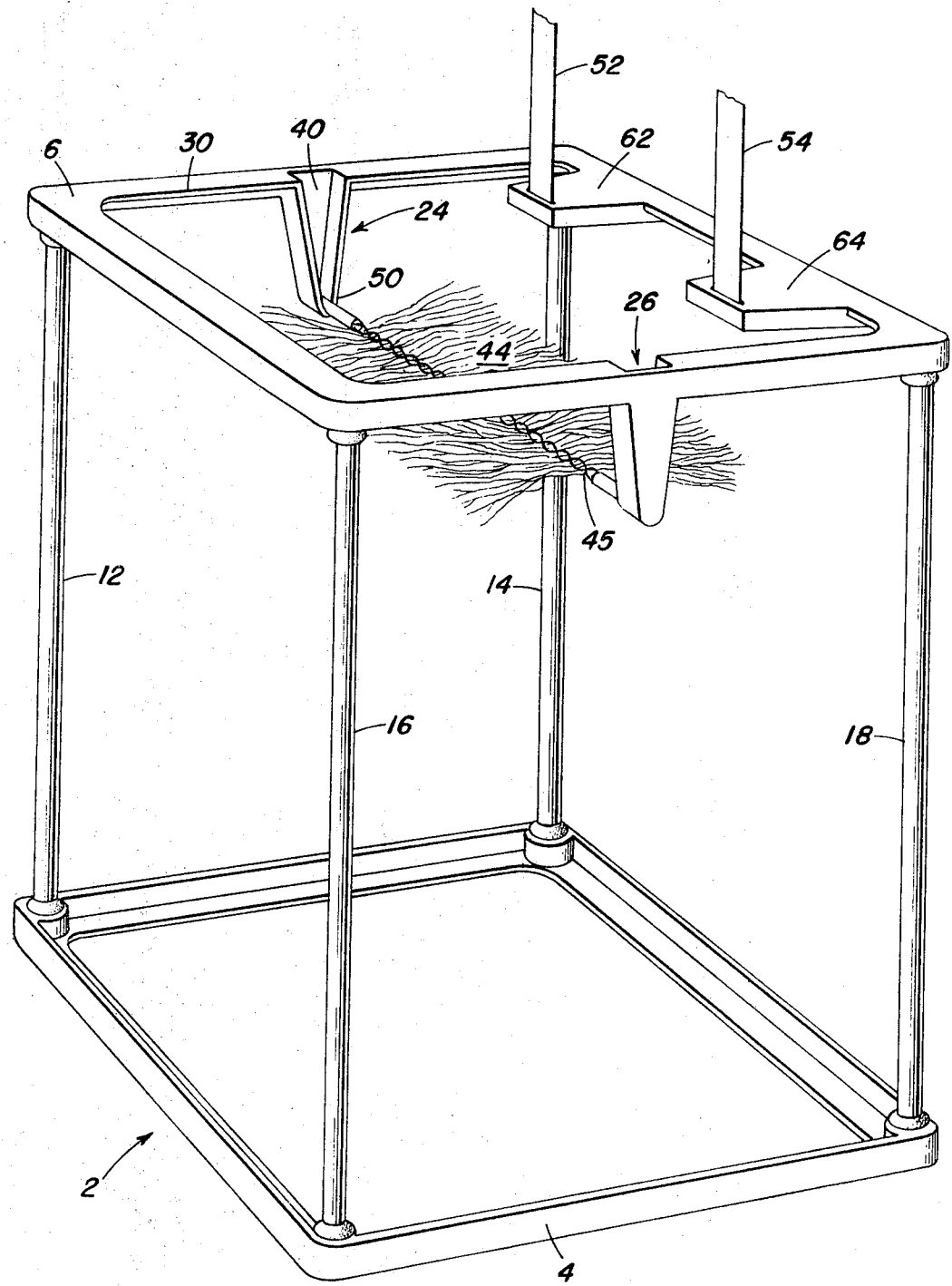
FIG. 1 is a perspective view of a breeding device frame over which is placed a foraminous fish-net fabric. The device is partially broken away at resilient members 52 and 54.

Preferred embodiments of the invention are shown in the accompanying drawings, in which the device is generally designated by reference numeral 2. It comprises a base 4 and a top 6 each of which have a generally square or rectangular shape and having an overall general shape identical to one another. The top 6 is joined to the base 4 by virtue of corner posts 12, 14, 16 and 18 which fit into receiving holes at the four corners of both the base 4 and the top 6. Somewhere across parallel sides of the top member 6 are V-shaped holding members 24 and 26 which are formed integrally with the top 6 during the molding or other forming operation. The V-shaped holding means depend from the surface 30 of top 6 and are provided with a backing 40 to restrain horizontal movement of sprays or strands of artificial breeding material placed within this permanent depending holding means.

The breeding grass or vegetation 44 consists of a suitable artificial or synthetic fibrous material which when inserted in the water will simulate natural breeding vegetation. It is woven about a central strand or support 45. The central strand consisting of a firm member substantially rigid is placed within the V-shaped holding means on the distended ledge of surface 30 at 50.

Figure 3:
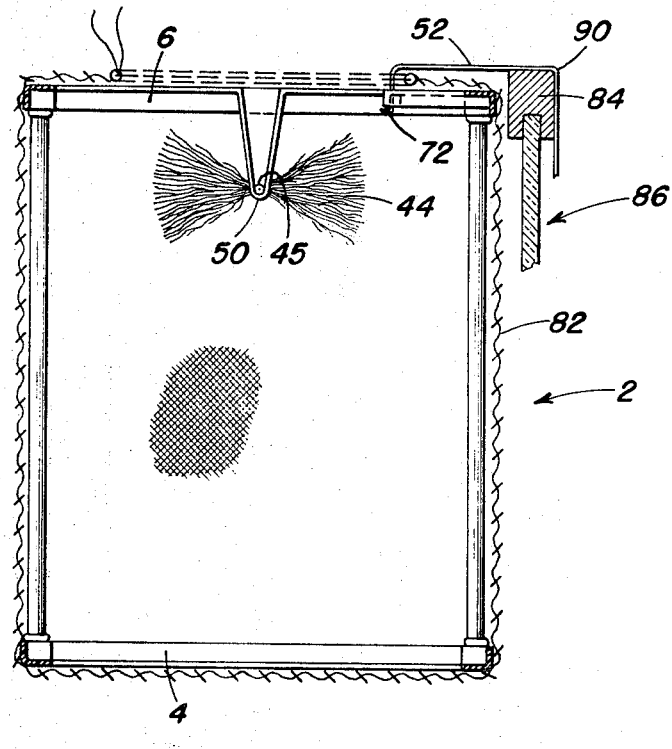
FIG. 3 is a sectional view taken along line 3—3 of FIG. 1 showing the breeding device secured against an aquarium wall.
Figure 2:
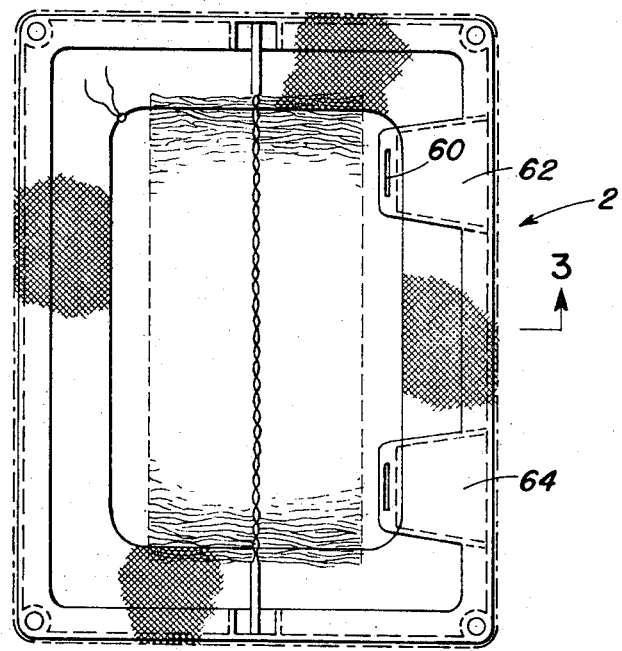
FIG. 2 is a plan view of the breeding device of the present invention without resilient members 52 and 54 in place.

On another side of the breeding device there is provided at least one inwardly extending tab means adaptable to hold a resilient mounting means which fastens the breeding device to a side of the aquarium. In the embodiment shown there are two inwardly extending tab members 52 and 54 having substantially a trapezoidal configuration. Toward or proximate the end of each tab member there is provided a slit 60 and 61 through which resilient holding means 52 and 54 pass. As seen in FIG. 3 with respect to resilient holding means 52, it is bent slightly beneath tab 52 at 72 and passes through slit 60 over net 82 and thence over the upper edge 84 of an aquarium side 86 and is affixed by virtue of being bent at 90 and held against the upper edge 84. The resilient holding means 54 is similarly inserted into tab 64 through slit 61 and bent at the same points to hold the entire frame firm against upper edge 84 of aquarium side 86. Thus, the entire breeding device is permitted to be fastened firmly to the aquarium facilitating a close fit of the foraminous net 82 over the frame so that fish in the aquarium proper cannot get into the breeding device where they consume young fish, and conversely the pregnant female fish cannot jump out of the device because of the overhang of the net on all four sides of the top of the device.

The V-shaped holding-means structure enables the suspension of the strand 45 therein provided with artificial or synthetic breeding grass 44 where it can be held within the water and due to the sides of the V-shaped holding means is restrained from movement relative to the breeding device itself.

It can be seen that the present breeding device allows a positive circulation of aquarium water through the netting. The pregnant female cannot injure herself trying to escape from the trap as would happen in some prior art breeding devices constructed largely of rigid plastic, e.g. polystyrene. The soft netting used in the present invention prevents this. Escape by jumping is more surely prevented due to the fact that the netting overlays all four sides of the top of the frame due to provision of the inwardly extending tabs which hold the deformable material. Prior art devices are covered on three sides only because of interference by the mounting means. The fish end up out of the aquarium since they try to escape from confined areas. Of course, the breeding grass prevents the female from eating the newly born fish since it provides a natural hiding place for them.

The terms and expressions used herein have been used as terms of description and not of limitation, as there is no intention, in the used of such terms and expressions of excluding any equivalents or portions thereof, as many modifications are possibly within the scope of the appended claims.

I claim:

1. In a breeding device including a frame holding a foraminous material and defining a confined area, the improvement which comprises support means and a strand of artificial breeding grass, said support means being integral with the frame, and said strand of artificial breeding grass being positioned on said support means within the confines of said foraminous material.

2. An improvement according to claim 1, wherein said support means hold said breeding grass in depending position lower than an upper surface of said frame.

3. An improvement according to claim 2, wherein said support means comprises a V-shaped member on each of the opposite sides of the frame in which the central strand of the breeding grass rests.

4. An improvement according to claim 3, wherein said V-shaped member is provided with a backing and an upper surface of said frame integral therewith forming the same.

5. In a breeding device including a frame holding a foraminous material and defining a confined area, said frame adapted to be mounted on a side of an aquarium, the improvement which comprises at least one inwardly extending tab member integral with the upper surface of said frame receiving a deformable mounting means for mounting said breeding device in stationary position against the side of the aquarium and a strand of breeding grass supported by said frame within the confines of said foraminous material.

6. An improvement according to claim 5, wherein there are a pair of tab members located on the same side of said frame.

7. An improvement according to claim 6, wherein said tab members are provided with laterally running slits proximate their end toward the center of the breeding device to accommodate a resilient holding means comprising a metal strip which is bent beneath each tab and secures said breeding device against the aquarium by being bent over the aquarium side.

8. An improvement according to claim 7, wherein said frame includes depending means integral therewith for holding artificial breeding grass.

9. An improvement according to claim 8, wherein said depending means for holding breeding grass comprises oppositely positioned V-shaped members.